(12) United States Patent
Foti

(10) Patent No.: US 8,768,603 B2
(45) Date of Patent: Jul. 1, 2014

(54) MOBILE TERMINAL RELAYING OF EVENT NOTIFICATIONS IN AN INTELLIGENT TRANSPORTATION SYSTEM

(75) Inventor: George Foti, Dollard des Ormeaux (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 13/482,654

(22) Filed: May 29, 2012

(65) Prior Publication Data

US 2013/0325305 A1    Dec. 5, 2013

(51) Int. Cl.
*G08G 1/00* (2006.01)
*G06G 7/76* (2006.01)

(52) U.S. Cl.
USPC .......................................................... 701/117

(58) Field of Classification Search
USPC .......................................................... 701/117
See application file for complete search history.

(56) References Cited

U.S. PATENT DOCUMENTS

| | | | |
|---|---|---|---|
| 7,742,452 B2 * | 6/2010 | Visotsky et al. | 370/331 |
| 7,925,425 B2 * | 4/2011 | Tomita et al. | 701/118 |
| 8,036,782 B2 * | 10/2011 | Patel et al. | 701/1 |
| 8,149,717 B2 * | 4/2012 | Gossain et al. | 370/238 |
| 8,179,848 B2 * | 5/2012 | Alay et al. | 370/329 |
| 8,209,114 B2 * | 6/2012 | Ishikawa et al. | 701/118 |
| 8,280,308 B2 * | 10/2012 | Anschutz et al. | 455/41.2 |
| 8,296,047 B2 * | 10/2012 | Sugawara et al. | 701/119 |
| 8,311,726 B2 * | 11/2012 | Patel et al. | 701/117 |
| 2002/0145541 A1 * | 10/2002 | Matsui et al. | 340/934 |
| 2007/0167147 A1 | 7/2007 | Krasner et al. | |
| 2007/0229309 A1 * | 10/2007 | Tomita et al. | 340/992 |
| 2008/0167774 A1 * | 7/2008 | Patel et al. | 701/36 |
| 2010/0076670 A1 * | 3/2010 | Turner et al. | 701/117 |
| 2011/0018736 A1 | 1/2011 | Carr | |
| 2011/0106337 A1 * | 5/2011 | Patel et al. | 701/2 |
| 2012/0016536 A1 * | 1/2012 | Patel et al. | 701/2 |

OTHER PUBLICATIONS

The European Telecommunications Standards Institute (ETSI). "Intelligent Transport Systems (ITS); Vehicular Communications; Part 4: Geographical Addressing and Forwarding for Point-to-Point and Point-to-Multipoint Communications; Sub-part 1: Media-Independent Functionality." Draft ETSI, TS 102-636-4-1, V0.1.1, Feb. 2011, pp. 1-88, Sophia-Antipolis Cedex, France.
Leontiadis, I., et al., "Publish/Subscribe Notification Middleware for Vehicular networks", Proceedings of the 4th on Middleware doctoral symposium, Nov. 26, 2007, pp. 1-6, Newport Beach, CA, US.

* cited by examiner

*Primary Examiner* — Mary Cheung
*Assistant Examiner* — Anne Mazzara
(74) *Attorney, Agent, or Firm* — Coats & Bennett, PLLC

(57) ABSTRACT

Embodiments include a mobile terminal and an intelligent transportation system (ITS) application client associated with a vehicle. The mobile terminal establishes a first communication link between the mobile terminal and the ITS application client. The mobile terminal also establishes a second communication link, via an infrastructure-based wireless communication network, between the mobile terminal and an ITS application server. Having established these links, the mobile terminal relays one or more event notification messages between the ITS application client and the ITS application server via the first and second links. These one or more messages each indicate the occurrence of an event pertinent to travel conditions. Relaying of messages by the mobile terminal in this way advantageously allows the ITS application client associated with the vehicle to send messages to and/or receive messages from the ITS application server, even if the vehicle itself is not configured to connect to the infrastructure-based network.

24 Claims, 10 Drawing Sheets

MOBILE TERMINAL RELAYING OF EVENT NOTIFICATIONS IN AN INTELLIGENT TRANSPORTATION SYSTEM

TECHNICAL FIELD

The present invention generally relates to the sending of event notification messages between an intelligent transportation system (ITS) application client and an ITS application server, and particularly relates to use of a mobile terminal to relay those messages via an infrastructure-based wireless communication network.

BACKGROUND

An intelligent transportation system (ITS) provides vehicle operators with a wealth of information that enables the operators to make informed decisions about how they operate their vehicles. Information provided by an ITS may for instance notify an operator about the occurrence of an event that is pertinent to travel conditions in the area of his or her vehicle, such as the occurrence of traffic, an accident, hazardous road conditions, or the like.

In order for an ITS to provide this information to vehicle operators, vehicles are equipped with sensors and other information sources that detect the occurrence of these events. The information sources may detect, for instance, a low speed indicative of heavy traffic, an impact characteristic of an accident, or the skidding of a vehicle's tires on a slippery surface. An ITS application client associated with the detecting vehicle then generates an event notification message and transmits that message to surrounding vehicles via short-range wireless communications (e.g., dedicated short-range communications in the 5.9 Ghz band). Vehicles that receive the event notification message propagate the message to other vehicles, as appropriate, so as to form a vehicular ad-hoc wireless communication network (VANET).

This VANET, however, limits the ITS in some respects. As the population of ITS-enabled vehicles increases, the spectrum used for the VANET will become congested. The congestion will delay event notification message propagation and will therefore threaten the effectiveness of the ITS to provide event notification in a timely fashion. Furthermore, because the VANET relies on vehicle presence for message propagation, the VANET often only propagates event notifications to vehicles within the immediate area of an event.

These VANET limitations have prompted so-called cooperative ITSs (C-ITSs) that employ both a VANET and an infrastructure-based wireless communication network in a cooperative fashion. An infrastructure-based network in this regard includes for instance a cellular communication network (e.g., a Long Term Evolution, LTE, network, a High Speed Packet Access, HSPA, network, etc.) or any similar network that employs infrastructure for routing communications between communication endpoints. In such a C-ITS, the ITS application client associated with a vehicle transmits an event notification message to surrounding vehicles via the VANET, but also transmits the message to an ITS application server via the infrastructure-based network. The ITS application server determines the geographical area over which the event notification message is relevant (e.g., outside of the immediate vicinity of the event), and then sends the message to a so-called geomessaging server that distributes the message over the determined area via the infrastructure-based network.

Problematically, though, vehicles will not receive the event notification message from the ITS application server, even if they would have been able to receive the message via a VANET had they been near the event, if they are not configured to communicate with that server. A vehicle may not be configured to communicate with the ITS application server if the vehicle is not connected to the infrastructure-based network, e.g., because either the vehicle is not equipped with an interface capable of connecting to that network or the vehicle operator declines to pay for a subscription to the network. Or, even if the vehicle is connected to an infrastructure-based network, the vehicle may still not be able to communicate with the ITS application server if that network does not implement a geomessaging server.

SUMMARY

One or more embodiments herein include a mobile terminal that relays event notification messages between an ITS application server and an ITS application client associated with a vehicle, via an infrastructure-based wireless communication network. This way, even if the vehicle itself is not configured to connect to the infrastructure-based network, the ITS application client is still able to send messages to and/or receive messages from the ITS application server.

More particularly, embodiments herein include a method implemented by a mobile terminal for use in a cooperative ITS. The method entails establishing a first communication link between the mobile terminal and an ITS application client associated with a vehicle. The method also includes establishing a second communication link, via an infrastructure-based wireless communication network, between the mobile terminal and an ITS application server. Finally, the method comprises relaying one or more event notification messages between the ITS application client and the ITS application server via the first and second links. Each of these messages indicates the occurrence of an event pertinent to travel conditions.

In at least some embodiments, this first communication link is established via short-range wireless communications. In other embodiments, though, the first link is established via wired communications or other types of communication.

In one or more embodiments, the mobile terminal relays event notifications (at least in an uplink direction) in a dedicated fashion for the ITS application client associated with a vehicle. In this case, processing at the mobile terminal includes receiving one or more event notification messages from one or more ITS application clients associated with one or more other vehicles, and then filtering those received event notification messages to selectively relay the one or more messages received from the ITS application client associated with the vehicle.

In one or more embodiments, the mobile terminal relays event notifications (at least in a downlink direction) in a shared fashion for the ITS application clients associated with multiple vehicles. In this case, processing at the mobile terminal includes sending the one or more event notification messages, via a vehicular ad-hoc wireless communication network, to one or more other vehicles within the vicinity of the vehicle.

In one or more embodiments, the mobile terminal is configured to relay event notification messages as described above in the context of a cooperative ITS that utilizes a so-called geomessaging server. In these embodiments, the mobile terminal itself includes a geomessaging client that is configured to communicate with the geomessaging server, and an emulator client that is configured to emulate the ITS application client associated with the vehicle. Configured in this way, the mobile terminal establishes the first communication link between the emulator client and the ITS application client associated with the vehicle, and establishes the second communication link between the geomessaging client on the terminal and the ITS application server (via the geomessaging server). The mobile terminal thus performs the above-mentioned relaying by relaying event notification messages between the emulator client and the ITS application client via the first link, and by relaying event notification messages between the geomessaging client on the terminal and the ITS application server (via the geomessaging server).

In at least some embodiments, relaying messages in this way entails adapting messages received via one link for being relayed via the other link. In this case, the geomessaging client on the terminal receives one or more messages from the ITS application server, through the geomessaging server, via the second link. The geomessaging client adapts these messages for being relayed to the ITS application client, via the first link, by the emulator client on the mobile terminal that emulates the ITS application client. Likewise, when the emulator client receives one or more event notification messages from the ITS application client via the first link, and adapts those messages for being relayed to the ITS application server, through the geomessaging server, via the second link, by the geomessaging client.

In one or more embodiments, processing at the mobile terminal further includes mapping one of multiple flows of relayed messages to the ITS application client and sending information indicating that mapping from the geomessaging client to the geomessaging server. In this case, relaying entails relaying the one or more messages based on that mapping.

In one or more other embodiments, processing at the mobile terminal entails receiving information from the geomessaging server indicating a first defined geographical area in which the vehicle is located. Then, responsive to determining that the vehicle is no longer located within that first area, processing includes sending information from the geomessaging client to the geomessaging server indicating the vehicle is no longer located within the first area and receiving a response from the geomessaging server indicating a second defined geographical area in which the vehicle is now located.

In still one or more other embodiments, processing at the mobile terminal involves receiving information from the geomessaging server indicating a defined geographical area in which the vehicle is located. In this case, relaying entails relaying the one or more messages from the ITS application server to the ITS application client. Each of these messages indicates the occurrence of an event pertinent to travel conditions in the indicated area.

Embodiments herein further include corresponding processing performed by the ITS application client associated with the vehicle. Such processing includes establishing a first communication link between the ITS application client and a mobile terminal that is configured to establish a second communication link, via an infrastructure-based wireless communication network, between the mobile terminal and an ITS application server. Processing then entails sending one or more event notification messages to, or receiving one or more event notification messages from, the ITS application server via the first and second links, by sending the one or more messages to, or receiving the one or more messages from, the mobile terminal via the first link. Again, these one or more messages each indicate the occurrence of an event pertinent to travel conditions.

In one or more embodiments, establishing this first link comprises establishing the first link between the ITS application client and an emulator client on the mobile terminal that emulates the ITS application client. In this case, sending or receiving comprises sending the one or more messages to, or receiving the one or more messages from, the emulator client via the first link.

Embodiments herein further include corresponding apparatus for the mobile terminal and the ITS application client.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
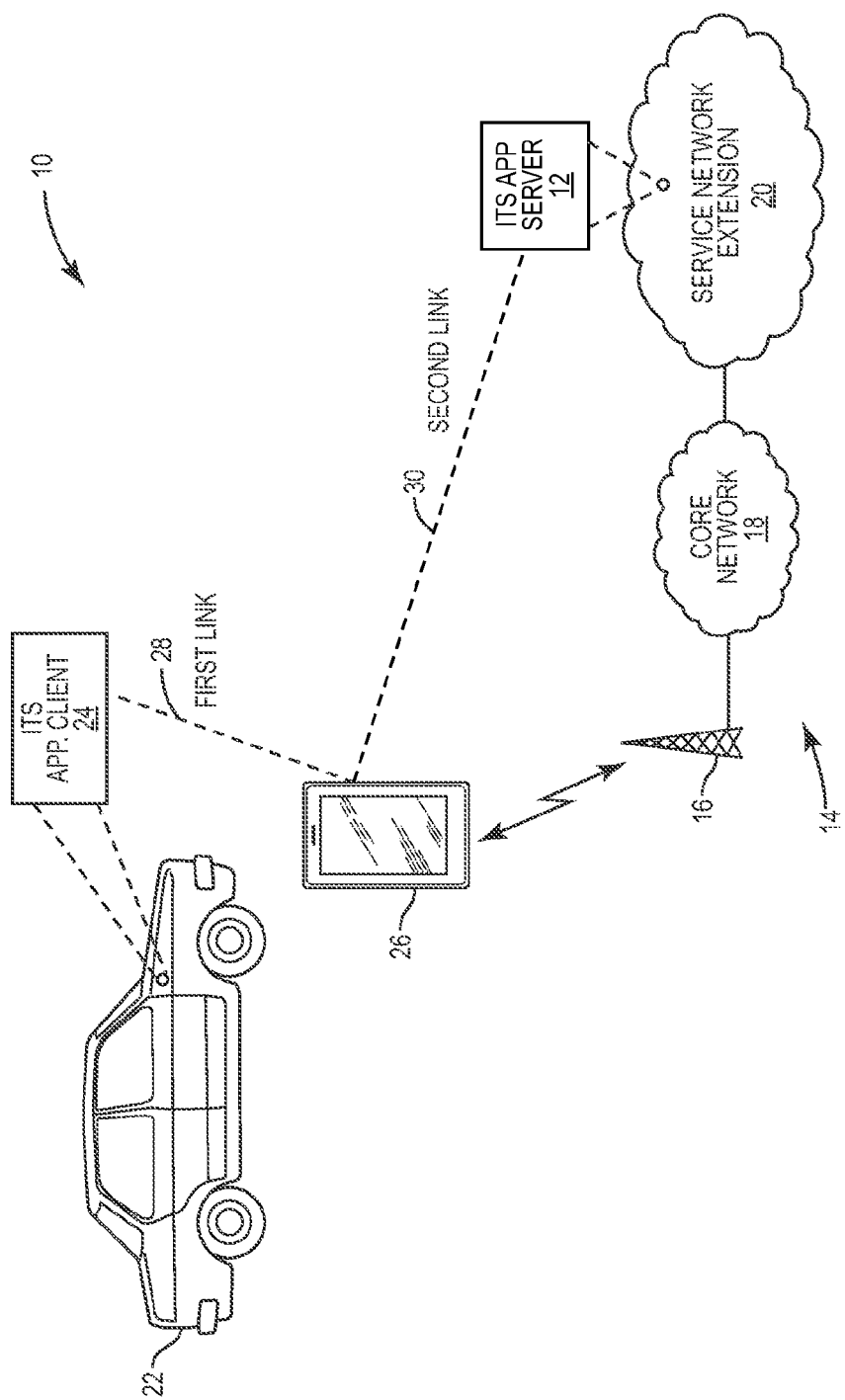
FIG. 1 is a block diagram of a cooperative intelligent transportation system (ITS) that includes a mobile terminal and an ITS application client associated with a vehicle according to one or more embodiments.

FIG. 1 depicts a cooperative intelligent transportation system (ITS) 10 according to one or more embodiments. The cooperative ITS 10 provides the operators of vehicles with information that enables the operators to make informed decisions about how they operate their vehicles. Of particular relevance herein, at least some of the information provided by the cooperative ITS 10 notifies the operators of vehicles about the occurrence of events that are pertinent to travel conditions in the area, such as the occurrence of traffic, a collision, hazardous road conditions, or the like.

In general, vehicles near an event send event notification messages directly amongst themselves in order to notify each other about the event's occurrence. In order to notify vehicles outside the immediate vicinity of the event, though, the cooperative ITS 10 includes an ITS application server 12. The ITS application server 12 receives information from a plurality of sources, including vehicles, road side units, as well as external information. The server 12 aggregates and consolidates this information, and then disseminates an event notification message based on that information over a relevant geographical area.

Specifically in this regard, the ITS application server 12 disseminates such an event notification message to ITS application clients associated with vehicles located outside the immediate vicinity of the event (as well as those within the vicinity of the event, in which case these vehicles may receive the same event notification message more than once). The server 12 disseminates the message in this way via an infrastructure-based wireless communication network 14. FIG. 1 depicts this infrastructure-based network 14 as a cellular network consisting of a plurality of base stations 16 (only one of which is shown) that provide wireless communication coverage for respective cells. In providing this coverage, the base stations 16 provide access via a core network 18 to a service network extension 20 in which the ITS application server 12 is implemented.

Embodiments herein contemplate that at least one vehicle 22 within the geographical area over which the ITS application server 12 disseminates an event notification message is not configured to communicate with the ITS application server 12. The vehicle 22 is not configured to communicate with the ITS application server 12, in one example, because the vehicle 22 is not configured to connect to the infrastructure-based network 14, e.g., the vehicle 22 is not equipped with an interface capable of connecting to that network 14 or the operator of the vehicle 22 declines to pay for a subscription to the network. With the vehicle 22 not configured to communicate with the ITS application server 12, an ITS application client 24 associated with the vehicle 22 will not receive an event notification message from that server 12. This remains the case even though the ITS application client 24 would have been able to receive an event notification message from another vehicle had the vehicle 22 been near the event; that is, the vehicle 22 is configured to communicate with other vehicles, but not configured to communicate with the ITS application server 12 via the infrastructure-based network 14.

Notably, even though the vehicle 22 is not configured to communicate with the ITS application server 12, the vehicle 22 in one or more embodiments herein will nonetheless receive an event notification message disseminated by that server 12. Indeed, according to these embodiments, the vehicle 22 will receive the message as relayed via a mobile terminal 26 that is configured to communicate with the ITS application server 12.

Figure 2:
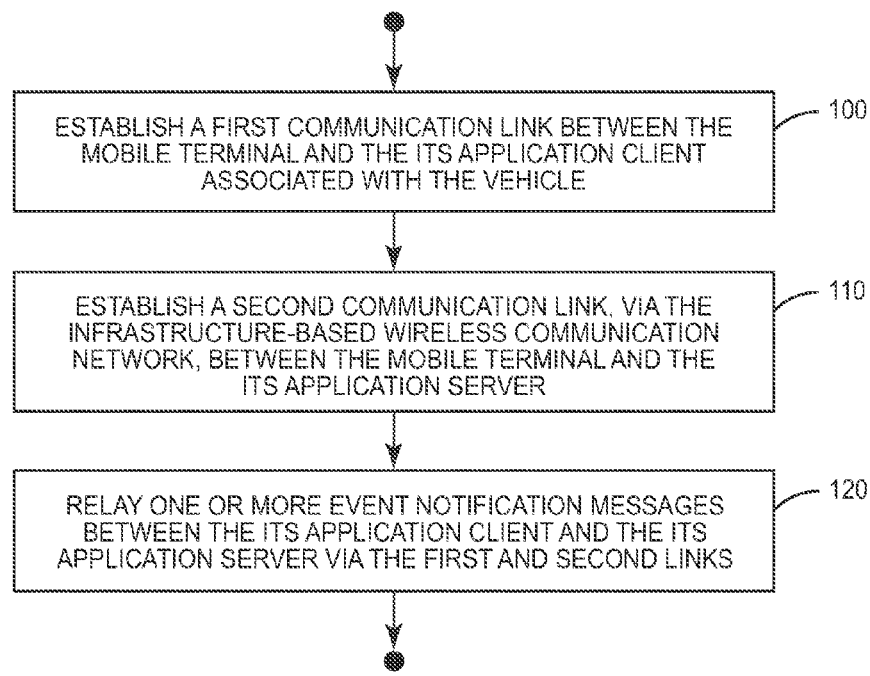
FIG. 2 is a logic flow diagram of processing performed by a mobile terminal for relaying one or more event notifications according to one or more embodiments.

FIG. 2 illustrates processing performed by the mobile terminal 26 in this regard. As shown in FIG. 2, processing at the mobile terminal 26 includes establishing a first communication link 28 between the mobile terminal 26 and the ITS application client 24 associated with the vehicle 22 (Block 100). In some embodiments, this first link 28 is established via short-range wireless communications, while in other embodiments the link 28 is established via wired communications, or other appropriate communication means. Regardless, processing further entails establishing a second communication link 30, via the infrastructure-based network 14, between the mobile terminal 26 and the ITS application server 12 (Block 110). Finally, processing at the mobile terminal 26 includes relaying one or more event notification messages between the ITS application client 24 and the ITS application server 12 via the first and second links 28, 30 (Block 120). As suggested above, each of these messages indicates the occurrence of an event pertinent to travel conditions.

Figure 3:
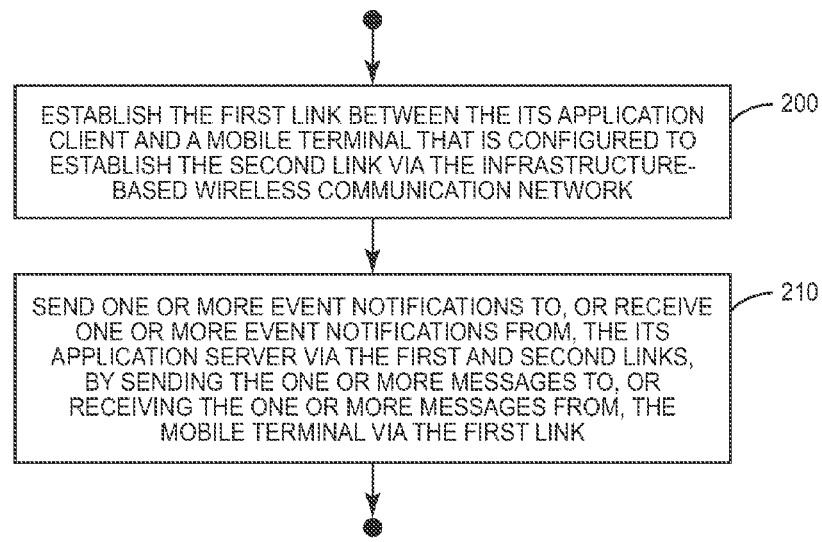
FIG. 3 is a logic flow diagram of processing performed by an ITS application client according to one or more embodiments.

FIG. 3 illustrates corresponding processing performed by the ITS application client 24 associated with the vehicle 22. As shown in FIG. 3, this processing includes establishing a first communication link 28 between the ITS application client 24 and a mobile terminal 26 that is configured to establish a second communication link 30, via an infrastructure-based network 14, between the mobile terminal 26 and an ITS application server 12 (Block 200). Processing then entails sending one or more event notification messages to, or receiving one or more event notification messages from, the ITS application server 12 via the first and second links 28, 30, by sending the one or more messages to, or receiving the one or more messages from, the mobile terminal 26 via the first link 28 (Block 210).

In at least some embodiments, the mobile terminal 26 described above is associated with the vehicle 22 for which the terminal 26 relays event notification messages, at least in the sense that the mobile terminal 26 is operated by an operator or passenger of the vehicle 22. In this case, the terminal's operator controls and prompts the discovery of the terminal 26 and the establishment of the first link 28 (e.g., the terminal's operator pairs the terminal 26 with the vehicle 22 where the first link 28 is established via Bluetooth). In other embodiments, however, the mobile terminal 26 is not associated with the vehicle 22, but instead is simply within communication range of the vehicle 22.

Regardless of whether the mobile terminal 26 is associated with the vehicle 22, the terminal 26 may be dedicated for relaying messages exclusively for the vehicle 22 or may be shared for relaying messages for other vehicles as well. The dedicated or shared nature of the mobile terminal 26 in this regard may be different for different communication directions. For example, the mobile terminal 26 in some embodiments is dedicated for relaying event notification messages in an uplink direction from the vehicle 22 to the ITS application server 12, but is shared for relaying event notification messages in a downlink direction from the ITS application server 12 to vehicles.

In embodiments where the terminal 26 is dedicated for relaying messages for the vehicle 22, at least in an uplink direction, the terminal 26 refrains from relaying messages from other vehicles to the ITS application server 12. Consider for example an embodiment where the mobile terminal 26 receives event notification messages from not only the ITS application client 24 associated with the vehicle 22, but also one or more ITS application clients associated with one or more other vehicles (not shown). This may be the case for instance where ITS application clients transmit event notification messages using the same communication protocol (e.g., dedicated short-range wireless communications in the 5.9 Ghz band for local broadcast) and/or over the same communication link 28. Regardless, the mobile terminal 26 filters the received event notification messages to selectively relay the one or more messages received from the ITS application client 24 associated with the vehicle 22. This filtering entails for instance inspecting a source address (e.g., an IP address) or other vehicle-specific identifier included in the received event notification message.

In alternative dedicated relaying embodiments, the ITS application client 24 associated with the vehicle 22 uses unicast dissemination to send its messages to the terminal 26 thus relieving the terminal 26 from the need to perform any message filtering. In this case, the ITS application client 24 sends messages to the mobile terminal 26 via the first link 28 with unicast dissemination, e.g., according to the geonetworking protocol where the first link 28 is established via dedicated short-range wireless communications in the 5.9 Ghz band. ETSI TS 102 636-4-1 V0.1.1 (2011-02).

By contrast, in embodiments where the mobile terminal 26 is shared for relaying messages for other vehicles as well, at least in a downlink direction, the terminal 26 receives one or more event notification messages from the ITS application server 12 and sends those messages to one or more other vehicles within the vicinity of the vehicle 22. In at least one embodiment, for example, the mobile terminal 26 sends the one or more messages in this way via a vehicular ad-hoc wireless communication network (VANET), e.g., implementing dedicated short-range wireless communications in the 5.9 Ghz band for local broadcast.

Figure 4:
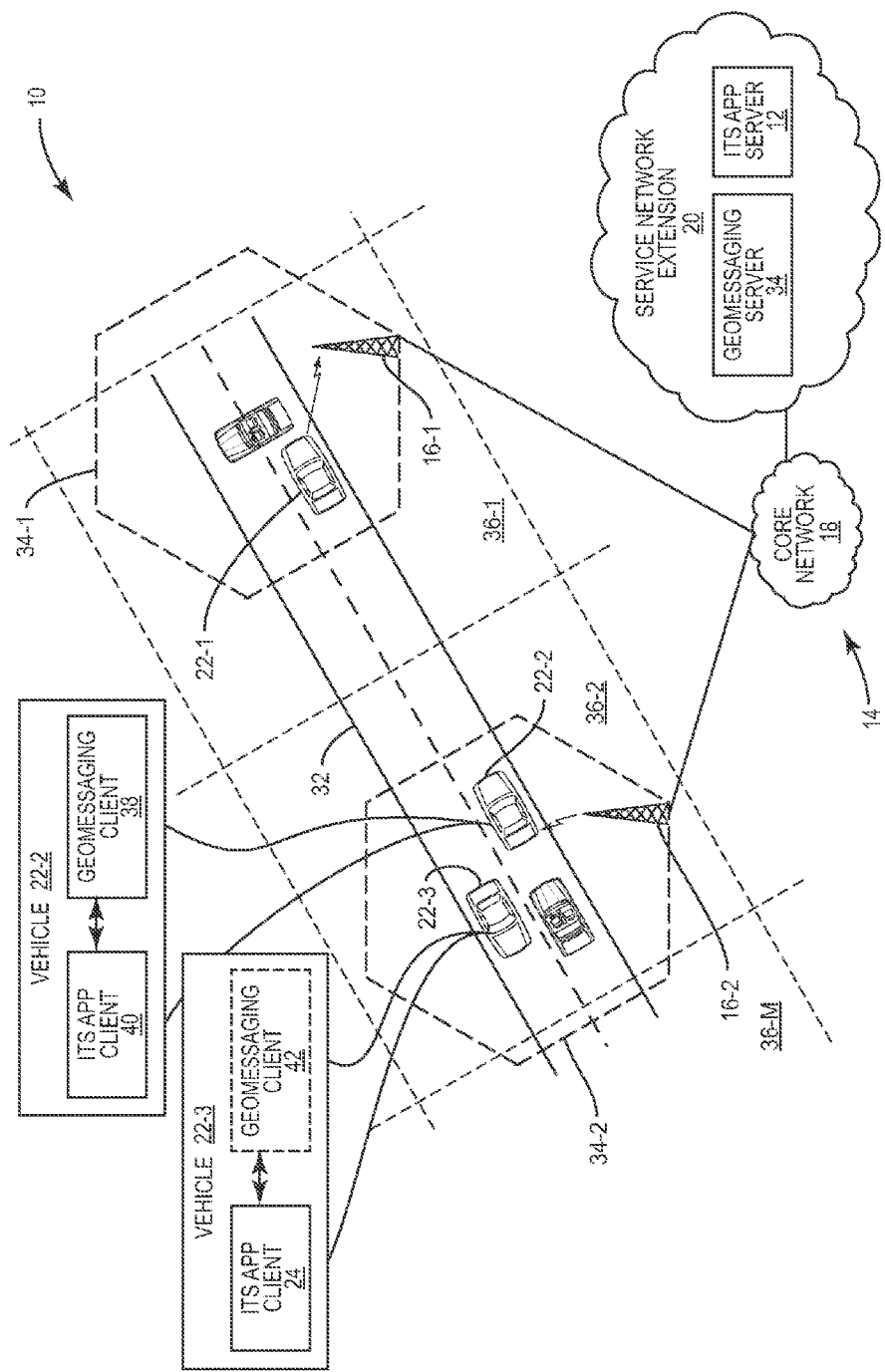
FIG. 4 is a block diagram of a cooperative ITS that utilizes a geomessaging server according to one or more embodiments.

In one or more embodiments, the mobile terminal 26 is configured to relay event notification messages as described above in the context of a cooperative ITS 10 that utilizes a so-called geomessaging server in the service network extension 20. FIG. 4 depicts one example of such a cooperative ITS 10.

As shown in FIG. 4, a vehicle 22-1 collides with another vehicle along a road 32. The vehicle 22-1 is equipped with one or more sensors that detect the impact of this collision. When the one or more sensors detect the collision, the vehicle 22-1 generates an event notification message that indicates the occurrence of the collision and then transmits that message directly to any nearby vehicles, e.g., via a VANET. The vehicle 22-1 also sends the message to a geomessaging server 34 in the service network extension 20 via the infrastructure-based network 14, by transmitting the message to a base station 16-1 that provides wireless coverage for a cell 34-1 in which the vehicle 22-1 is located. The geomessaging server 34 effectively serves as a proxy for the ITS application server 12 and thus forwards the event notification message to that server 12.

Upon the ITS application server 12 aggregating and consolidating the information it has received about this event as described above, the server 12 disseminates an event notification message over a geographical area where travel conditions are affected by the event. Specifically, the ITS application server 12 sends the event notification message to the geomessaging server 34 so that the geomessaging server 34 can selectively distribute the message to vehicles 22 within that geographical area.

In this regard, the geomessaging server 34 logically divides the geographical area it services into multiple defined geographical areas 36-1, 36-2, . . . 36-M (distinct from the cells 34 covered by base stations 16) and tracks the vehicles 22 that are located within any given area **36-*m* at any given time. When the geomessaging server 34 receives the event notification message from the ITS application server 12, the geomessaging server 34 obtains information, from the ITS application server 12 as well, that indicates the defined areas 36 where travel conditions are affected by the indicated event. The server 34 then determines which vehicles 22 are within the affected area(s) 36 based on its area-by-area tracking of vehicle locations, and sends an event notification message to geomessaging clients associated with those vehicles 22 via the infrastructure-based network 14**.

As shown in FIG. 4, for example, the geomessaging server 34 receives information from the ITS application server 12 indicating that travel conditions within defined geographical area 36-2 are affected by vehicle 22-1's collision. Having tracked the location of vehicle 22-2 on an area-by-area basis, the geomessaging server 34 identifies vehicle 22-2 as being located within the affected area 36-2. The server 34 therefore sends an event notification message indicating the occurrence of the collision to a geomessaging client 38 associated with that vehicle 22-2, via a base station 16-2 providing wireless coverage for a cell 34-2 within which the vehicle 22-2 is located. The geomessaging client 38 in turn provides this event notification message to the ITS application client 40 associated with the vehicle 22-2.

Figure 5:
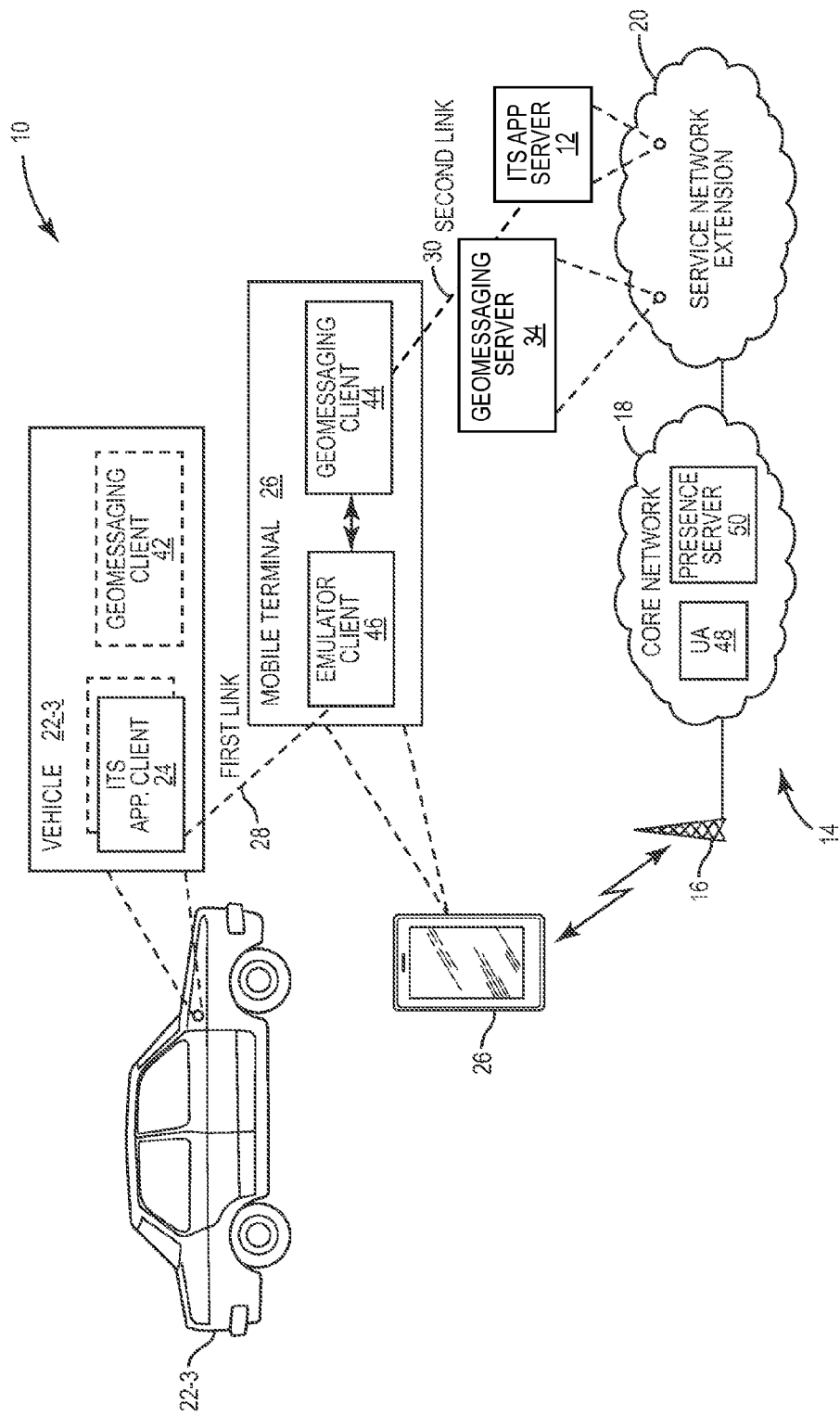
FIG. 5 is a block diagram of a mobile terminal that relays one or more event notification messages using an emulator client and a geomessaging client according to one or more embodiments.

However, not all vehicles within the affected area 36-2 are configured to communicate with the ITS application server 12 via the geomessaging server 34 in this way. Vehicle 22-3, for instance, either (i) does not implement a geomessaging client like that of vehicle 22-2; or (ii) implements a geomessaging client 42 but is not configured to communicate with the geomessaging server 34 and/or the infrastructure-based network 14, e.g., because the vehicle operator declined to pay for a subscription to the network 14. The ITS application client 24 associated with this vehicle 22-3 will therefore not receive the event notification message from the geomessaging server 34 in the same way as the ITS application client 40 associated with vehicle 22-2. Nor will the ITS application client 24 associated with vehicle 22-3 be able to send an event notification message to the geomessaging server 34 in the same way as vehicle 22-2. Instead, the vehicle 22-3 will send and receive event notification messages as relayed by a mobile terminal 26, as described above. FIG. 5 illustrates additional relaying details in this regard.

As shown in FIG. 5, the mobile terminal 26 itself includes a geomessaging client 44 that is configured to communicate with the geomessaging server 34 via the infrastructure-based network 14. The mobile terminal 26 in FIG. 5 also includes an emulator client 46 that is configured to emulate the ITS application client 24 associated with the vehicle 22-3. Configured in this way, the mobile terminal 26 establishes the first communication link 28 between the emulator client 46 and the ITS application client 26 associated with the vehicle 22-3, and establishes the second communication link 30 between the geomessaging client 44 on the terminal 26 and the ITS application server 12 (via the geomessaging server 34). The mobile terminal 26 thus performs the above-mentioned relaying by relaying event notification messages between the emulator client 46 and the ITS application client 24 via the first link 28, and by relaying event notification messages between the geomessaging client 44 on the terminal 26 and the ITS application server 12 (via the geomessaging server 34).

In at least some embodiments, relaying messages in this way entails adapting messages received via one link 28, 30 for being relayed via the other link 30, 28. In this case, the geomessaging client 44 on the terminal 26 receives one or more messages from the ITS application server 12 via the second link 30. The geomessaging client 44 adapts these messages in order for the emulator client 46 to relay the messages to the ITS application client 24 via the first link 28. Such adaptation in some embodiments involves converting the format or transmission protocol stack of the messages. Likewise, when the emulator client 46 receives one or more event notification messages from the ITS application client 24 via the first link 28, the emulator client 46 adapts those messages in order for the geomessaging client 44 to relay them to the ITS application server 12 via the second link 30.

Although as described above with respect to a single ITS application client 24, the geomessaging client 44 on the mobile terminal 26 functions as described to serve any number of ITS application clients 24 associated with the vehicle 22-3. The geomessaging client 44 serves in this role by establishing a session with the infrastructure-based network 14 prior to exchanging any data with the network 14 related to these clients 24. Following establishment of this session, the geomessaging client 44 relays different event notification messages for different ITS application clients 24. Specifically, such entails mapping different flows of relayed messages to different ITS application clients 24 (e.g., using different port assignments and service IDs). The geomessaging client 44 then sends information indicating this mapping to the geomessaging server 34, and relays event notification messages based on the mapping.

Those skilled in the art will appreciate that no particular communication technology or standard is required for practicing the above mentioned embodiments. For example, the infrastructure-based wireless communication network 14 may comprise any network that employs infrastructure for routing communications between communication endpoints, as opposed to ad-hoc networks that do not employ such routing infrastructure and instead rely on communication endpoints themselves for such routing. In embodiments where the infrastructure-based network 14 comprises a cellular network, the network 14 may implement any number of possible cellular technologies, including for instance technologies based on Long Term Evolution, LTE, High Speed Packet Access, HSPA, or the like.

Similarly, the first communication link 28 herein may be established via any number of possible communication technologies. For example, the first communication link is established in some embodiments via short-range wireless communication standards or protocols, including for instance dedicated short-range wireless communications in the 5.9 Ghz band, IEEE 802.11, Bluetooth, or the like.

With the above variations and modifications in mind, FIG. 5 illustrates one or more embodiments where the infrastructure-based network 14 implementation is based on an IP Multimedia Subsystem (IMS) architecture. In this case, the core network 18 includes the IMS core network, an HTTP/IMS User Agent (UA) 48, and a Presence Server 50. The IMS UA 48 and the Presence Server 50 assist the geomessaging server 34 with its area-by-area tracking of vehicle locations.

Specifically, the geomessaging client 44 on the mobile terminal 26 receives information from the geomessaging server 34 indicating a defined geographical area 36-2 in which vehicle 22-3 is located. While the vehicle 22-3 is located in this area 36-2, event notification messages that the mobile terminal 26 relays from the ITS application server 12 to the ITS application client 24 indicate the occurrence of an event pertinent to travel conditions in that area 36-2. Thereafter, however, the geomessaging client 44 determines that the vehicle 22-3 is no longer located within that area 36-2. Responsive to this determination, the geomessaging client 44 sends information, via the UA 48, to the geomessaging server 34 indicating that the vehicle 22-3 is no longer located within the area 36-2. Specifically, the geomessaging client 44 sends a location update to the UA 48. The UA 48 correspondingly publishes this location update to the Presence Server 50, which notifies the geomessaging server 34. The geomessaging server 34 then informs the geomessaging client 44 on the mobile terminal 26 of the coordinates for the new defined area 36-m vehicle 22-3 has entered. At some point in time later, when the geomessaging client 44 determines that the vehicle 22-3 is no longer located within that area 36-m, the geomessaging client 44 undertakes the above previous actions to inform the geomessaging server 44.

FIGS. 6A-6D illustrate additional details of the above embodiments in the case that the ITS 10 employs the Session Initiation Protocol (SIP) and the Hypertext Transport Protocol (HTTP). SIP is a textual-based protocol used to set up, modify, and teardown sessions. HTTP is an application protocol that functions as a request-response protocol in the client-server context.

In these embodiments, the mobile terminal 26 relays messages for multiple different applications on vehicle 22-3. These different applications include one or more ITS application clients 24 as well as zero or more non-ITS application clients. A non-ITS application client in this regard provides the vehicle operator with location-dependent information, but that information is not pertinent to travel conditions in the area. For example, a non-ITS application client provides the vehicle operator with advertisements targeted to the geographical location of the vehicle 22-3, such as the menu specials of nearby restaurants. Regardless, the mobile terminal 26 distinguishes between the different applications for which it relays messages in order to relay messages appropriately and in order to provide differentiated charging and quality of service if needed. In order to distinguish between the different applications for which the mobile terminal 26 relays messages, the terminal 26 allocates different port numbers to different applications. In at least some embodiments, the terminal 26 further distinguishes between the different applications using different service identities for those applications. By distinguishing between applications in this way, different applications can provide information related to different geographical areas.

Figure 6A:
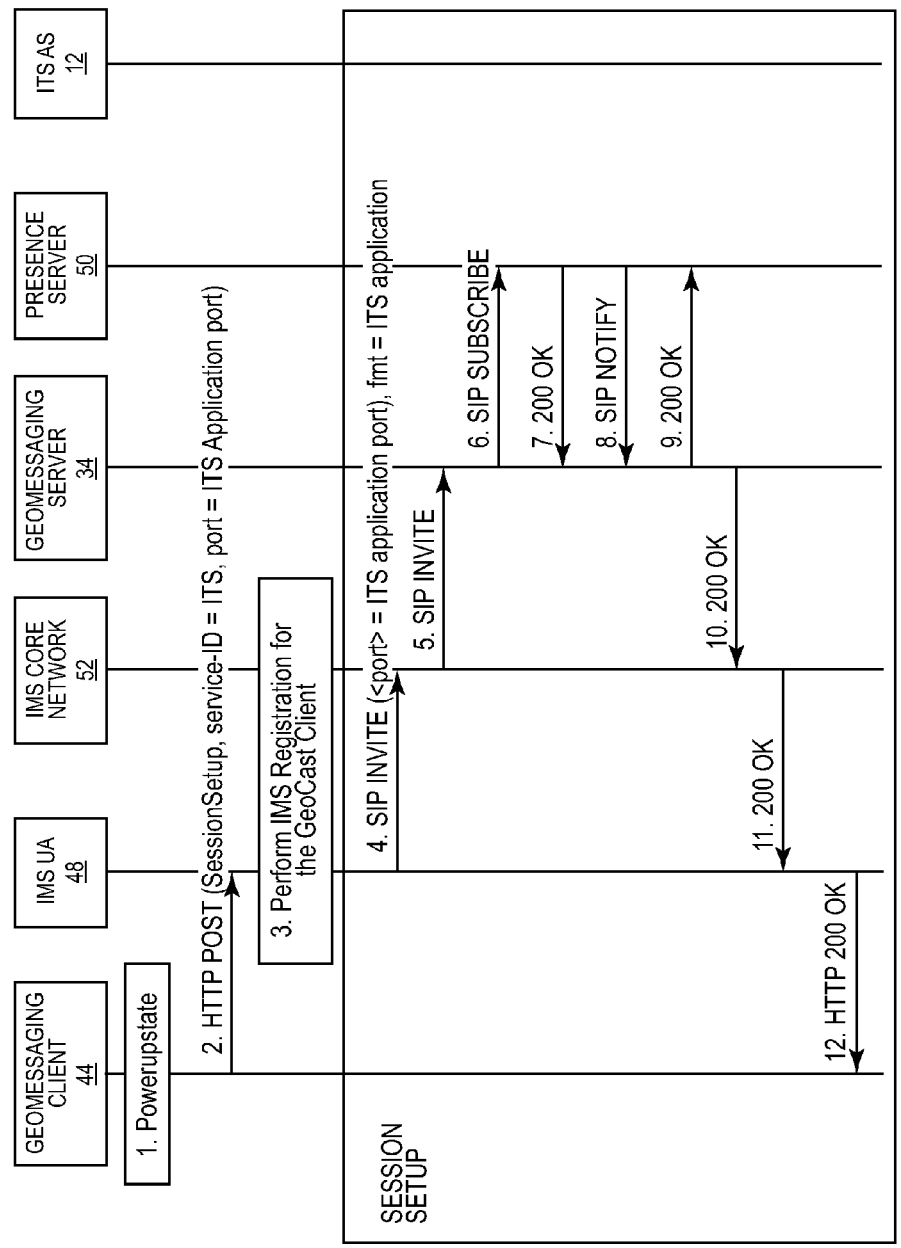
FIG. 6A is a call flow diagram of a session initiation procedure according to one or more embodiments.

FIG. 6A depicts the procedure implemented by the geomessaging client 44 on the mobile terminal 26 for registration and session initialization. As shown in FIG. 6A, power-up of the emulator client 46 triggers the geomessaging client 44 to initialize the procedure associated with such power-up, including registering with the IMS core network 52 and setting up an IMS session for data exchange (Step 1). In this regard, the geomessaging client 44 sends an HTTP POST request to the IMS UA 48 indicating that a session is being initiated for an ITS service (Step 2). The HTTP POST request includes a port number allocated to the ITS application client 24. This port will be included in all ITS application data. Upon receiving the HTTP POST request, the IMS UA 48 performs IMS registration on behalf of the emulator client 46 identified in the request (Step 3). IMS registration is performed only once and is refreshed autonomously by the IMS UA 48.

Next, the IMS session is set up. The IMS UA 48 sends a SIP INVITE to the IMS core network 52 (Step 4). The Session Description Protocol (SDP) within the SIP INVITE is used to set up a TCP session for application data exchange between the geomessaging client 44 and the geomessaging server 34. The SDP includes the same port number as the one received from the geomessaging client 44 in the HTTP POST request, as well as the service identity. This allows the geomessaging server 34 to associate the application data received later with the proper ITS application server, which is server 12 in this case, since the geomessaging server 34 maintains a mapping between port number, service identity, and application server The geomessaging server 34 receives the SIP INVITE as forwarded from the IMS core network 52 using IMS service control (Step 5). In response, the geomessaging server 34 subscribes to the presence server 50 by sending a SIP SUBSCRIBE to the presence server 50 (Step 6). This directs the presence server 50 to notify the geomessaging server 34 when the geomessaging client 44 associated with the vehicle 22-3 executing the ITS application client 24 sends a location update to the network 22 as described above. After the presence server 50 acknowledges the geomessaging server's subscription in this regard by returning a SIP 200 OK response (Step 7), the presence server 50 proactively sends an initial indication of the vehicle's location by sending a SIP NOTIFY to the geomessaging server 34 (Step 8). The geomessaging server 34 acknowledges this indication by sending a SIP 200

OK response to the presence server 50 (Step 9) and then acknowledges the IMS core network's SIP INVITE by sending a SIP OK response to the IMS core network 52 (Step 10). At this point, the geomessaging server 34 has established a binding between the emulator client 46 data IP flow, emulating ITS application client 24 on vehicle 22-3, and the ITS application server 12 so that the geomessaging server 34 can proxy any data for that flow to the ITS application server 12. Finally, the IMS core network 52 returns a SIP 200 OK response to the IMS UA 48 (Step 11), which in turns sends an HTTP 200 OK response to the geomessaging client 44 (Step 12). With the session set up in this way, the geomessaging server 34 thereafter updates the geomessaging client 44 of the location of vehicle 22-3, as indicated by the presence server 50.

Figure 6B:
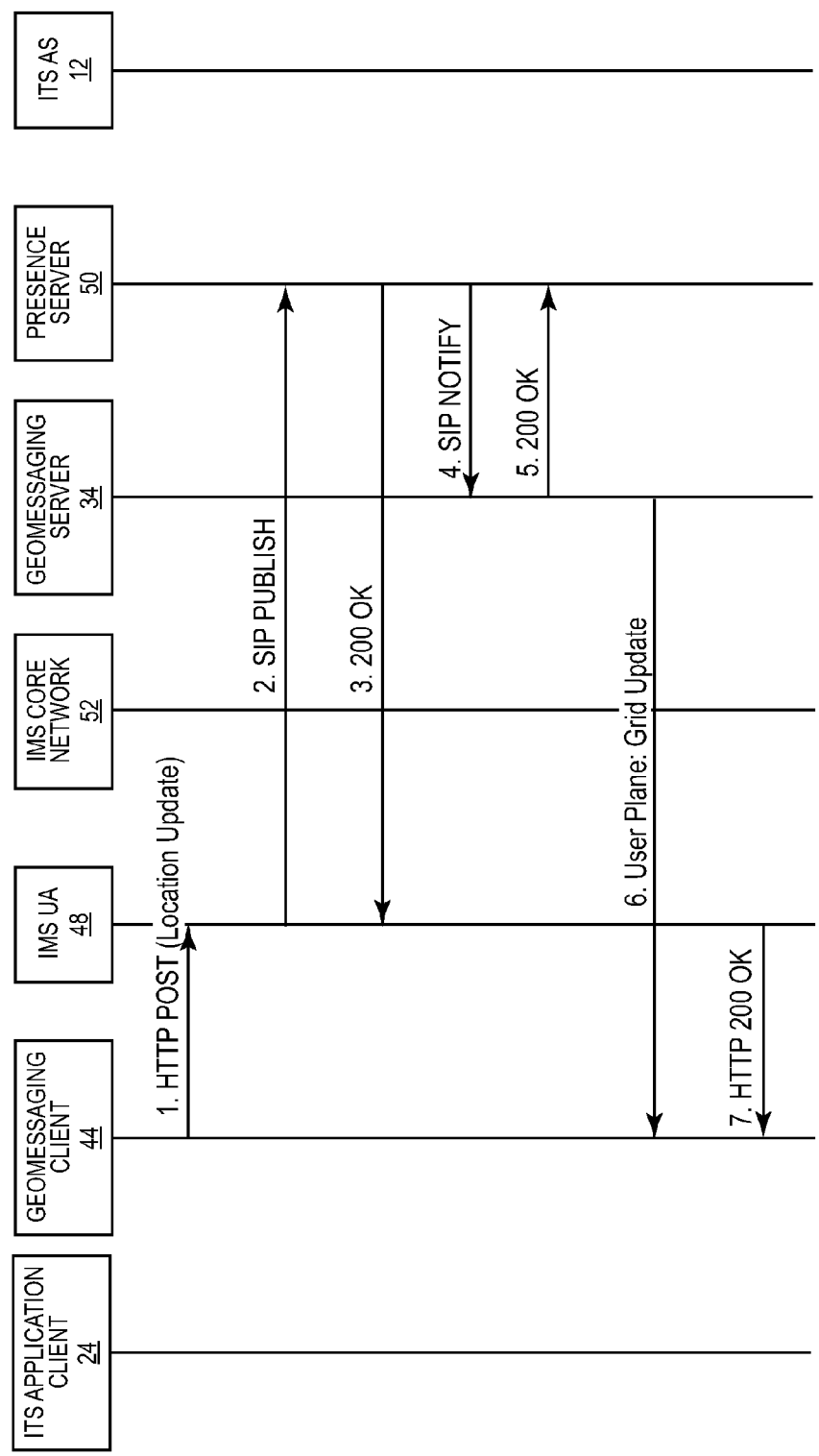
FIG. 6B is a call flow diagram of a location update procedure according to one or more embodiments.

As the vehicle 22-3 moves, though, the geomessaging client 44 updates the geomessaging server 34 of vehicle 22-3's location as needed according to the processing shown in FIG. 6B. Specifically, when the geomessaging client 44 determines that vehicle 22-3 is leaving its current defined area 36-2, the geomessaging client 44 sends an HTTP POST request to the IMS UA 48 in order to inform the UA 48 of that event and to provide an update of its new location (Step 1). Responsive to receiving the location update contained in the HTTP POST request, the IMS UA 48 sends a corresponding SIP PUBLISH message to the Presence Server 50 (Step 2). The Presence Server 50 acknowledges that message by sending a 200 OK response (Step 3) and then informs the geomessaging server 34 about the vehicle's new location by sending a SIP NOTIFY message (Step 4}.

The geomessaging server 34 correspondingly acknowledges the location update received from the presence server 50 by sending a 200 OK response (Step 5). The geomessaging server 34 also determines, based on the new location of the vehicle 22-3, the coordinates of the new defined area 36-m in which the vehicle 22-3 is located. The geomessaging server 34 sends the terminal's geomessaging client 44 these coordinates by sending the client 44 a grid update via the user plane (Step 6). Finally, the IMS UA 48 sends an HTTP 200 OK response to the geomessaging client 44.

Figure 6C:
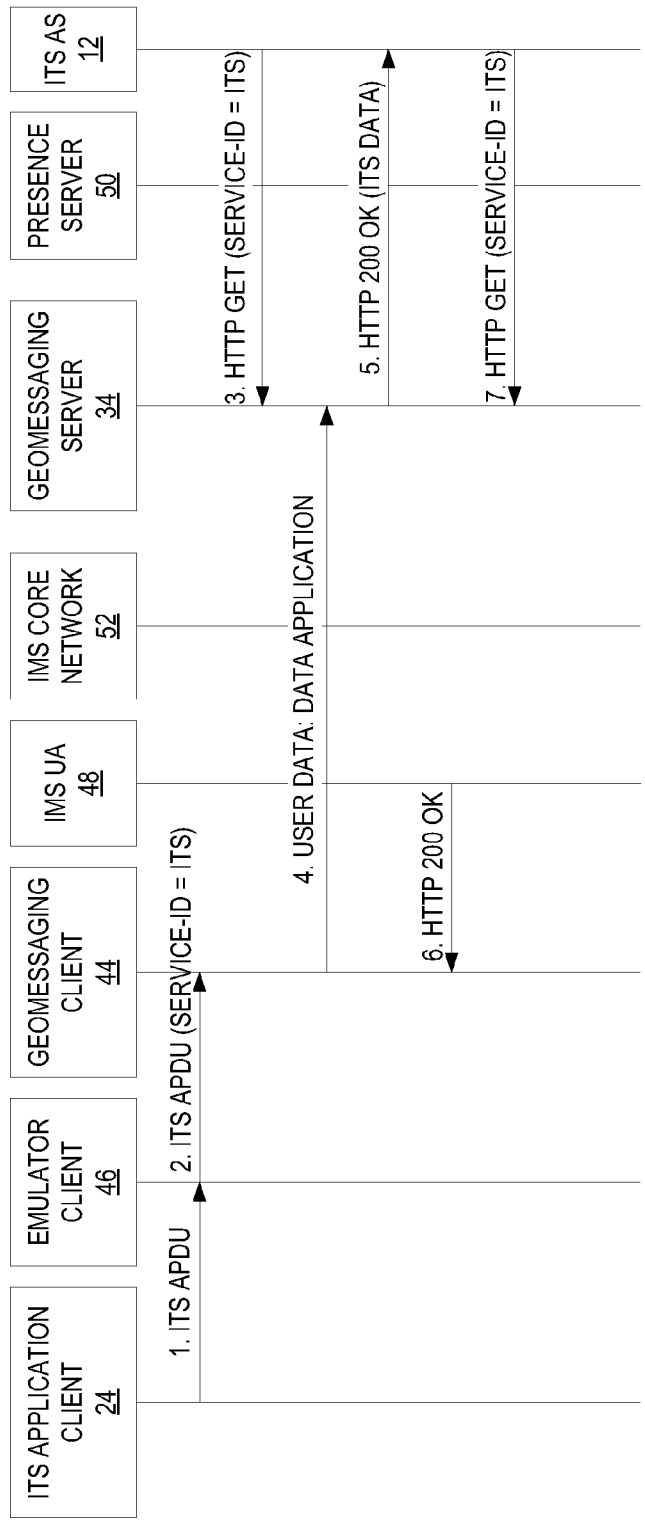
FIG. 6C is a call flow diagram of a procedure for relaying an event notification message from an ITS application client to an ITS application server according to one or more embodiments.

After session initiation in FIG. 6A, and after zero or more location updates according to FIG. 6B, the ITS application client 24 associated with vehicle 22-3 sends an event notification message (e.g., a decentralized environmental notification message, DENM) to the ITS application server 12 according to FIG. 6C. As shown in FIG. 6C, the ITS application client 24 sends the event notification message (shown generally as an ITS application protocol data unit, APDU) to the mobile terminal's emulator client 46 via the first link 28 (Step 1). The terminal 26 thereafter relays this message to the ITS application server 12. Specifically, the terminal's emulator client 46 sends the message to the terminal's geomessaging client 44, along with the service identity for the ITS application client 24 (Step 1).

In anticipation of receiving one or more event notification messages, the ITS application server 12 has previously sent an HTTP GET request to the geomessaging server 34 (Step 3). This GET request includes the service identity of the ITS application client 24 and uses a persistent connection for so-called long polling. Although shown as only sending a GET request with the service identity of client 24, the ITS application server 12 sends a GET request for each ITS application client on the vehicle from which it expects to receive information. At some point thereafter, the geomessaging client 44 sends the event notification message it received previously (in Step 2) to the geomessaging server 34 using the established TCP connection (Step 4) The geomessaging client 44 includes the port number allocated to the ITS application client 24 during session establishment as the originating port for the IP packets carrying the message. Upon receiving the message, the geomessaging server 34 recognizes that the message is targeted for receipt by the ITS application server 12, based on its mapping of the emulator client's port number to that server 12. Accordingly, the geomessaging server 34 sends an HTTP 200 OK to the ITS application server 12 including the event notification message (Step 5). In the meantime, the IMS UA 48 sends an HTTP 200 OK response to the geomessaging client 44 (Step 6). As the ITS application server's receipt of the HTTP 200 OK responds to the server's HTTP GET request (in Step 3), the ITS application server 12 again issues an HTTP GET request to the geomessaging server 34 in order to continue the long polling process (Step 7).

Figure 6D:
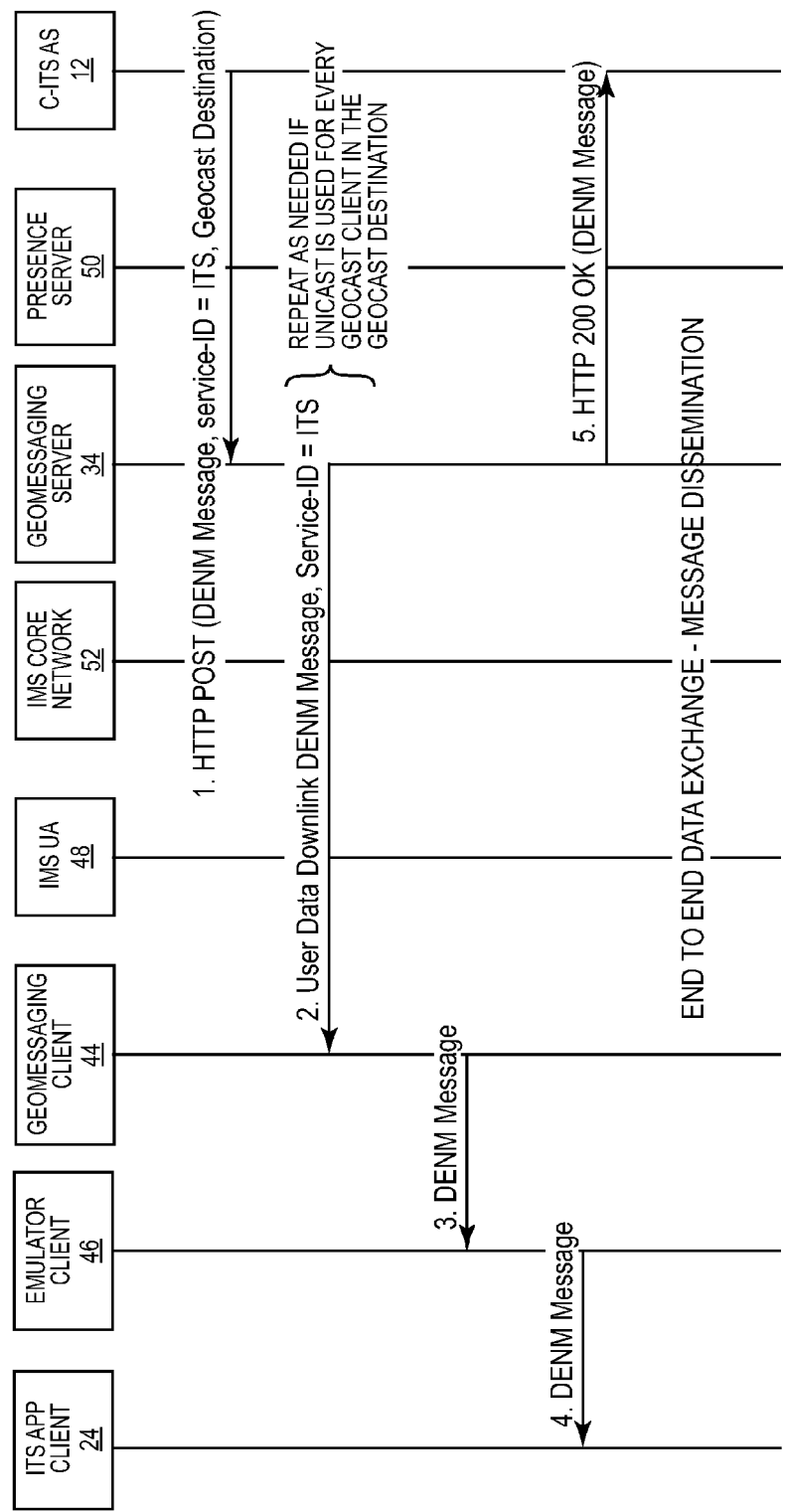
FIG. 6D is a call flow diagram of a procedure for relaying an event notification message from an ITS application server to an ITS application client according to one or more embodiments.

Alternatively or additionally to the terminal 26 relaying an event notification message from the ITS application client 24 to the ITS application server 12 as shown in FIG. 6C, the terminal 26 relays an event notification message from the ITS application server 12 to the ITS application client 24 as shown in FIG. 6D. As shown in FIG. 6D, the ITS application server 12 sends an HTTP POST to the geomessaging server 34 (Step 1). The ITS application server 12 includes in the HTTP POST the event notification message (shown here as a DENM) as well as a geographical target for message dissemination. The geomessaging server 34 identifies all geomessaging clients located in the geographical target and forwards the message to each of them. Accordingly, FIG. 6D shows that the geomessaging server 34 sends user data to the geomessaging client 44 on the mobile terminal 26 that includes the message (Step 2).

Upon receiving the user data from the geoemssaging server 34, the geomessaging client 44 then sends the message to the emulator client 46 (Step 3). The emulator client 46 correspondingly sends the message to the ITS application client 24 that it emulates (Step 4). Finally, the geomessaging server 34 sends an HTTP OK message to the ITS application server 12 in order to close the HTTP transaction associated with message dissemination (Step 5).

Those skilled in the art will appreciate that while FIG. 4 illustrates the defined geographic areas 36 as fixed, rectangular tiles, the present invention is not so limited. In fact, the size of the defined areas 36 can vary from application to application and as such provides considerable flexibility for targeting the vehicles 22 of interest depending on the application. Further, the size of the defined areas 36 can vary over time, e.g., based on the type of event notification message to be disseminated, based on vehicle traffic density or patterns, or the like. Still further, the defined areas 36 in some embodiments are optimized with respect to the topology of the road 14, e.g., the areas 36 may be designed to follow the run of major roads.

Those skilled in the art will also appreciate that a vehicle as used herein includes any land-based mobile machine that transports people or cargo (e.g., a car, truck, motorcycle, etc.).

Figure 7:
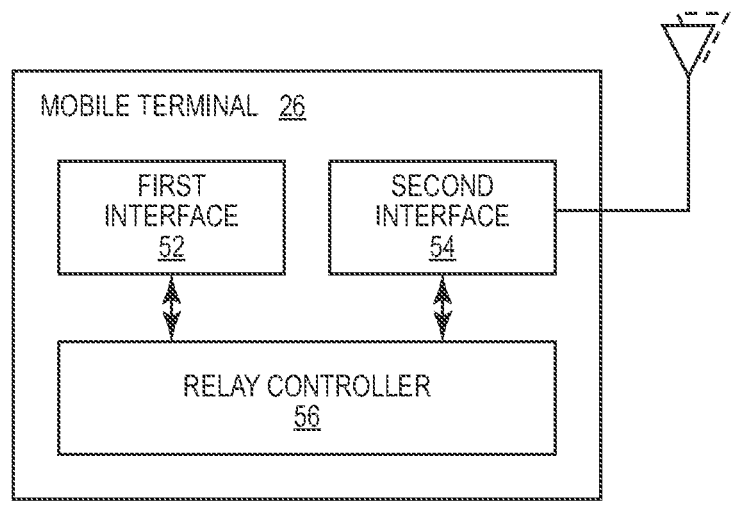
FIG. 7 is a block diagram of a mobile terminal configured according to one or more embodiments.

With the above variations and modifications in mind, those skilled in the art will appreciate that a mobile terminal 26 herein is generally configured as shown in FIG. 7 for performing as described above. The terminal 26 in this regard includes a first interface 52, a second interface 54, and a relay controller 56. The first interface 52 is configured to establish the first communication link 28 between the mobile terminal 26 and an ITS application client 24 associated with a vehicle 22-3. The second interface 54 conversely is configured to establish the second communication link 30, via the infrastructure-based wireless communication network 14, between the mobile terminal 26 and an ITS application server 12. Finally, the relay controller 56 is configured to relay one or more event notification messages between the ITS application client 24 and the ITS application server 12 via the first and second links 28, 30.

Figure 8:
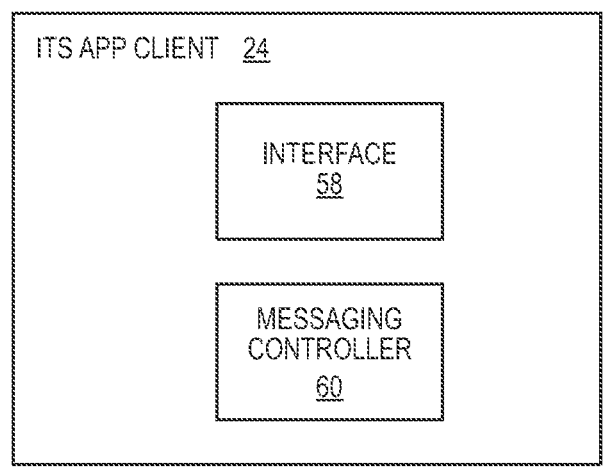
FIG. 8 is a block diagram of an ITS application client configured according to one or more embodiments.

Those skilled in the art will also appreciate that an ITS application client 24 associated with a vehicle 22-3 is generally configured as shown in FIG. 8 for performing as described above. The ITS application client 24 includes an interface 58 and a messaging controller 60. The interface 58 is configured to establish the first communication link 28 between the ITS application client 24 and a mobile terminal 26 that is configured to establish the second communication link 30, via the infrastructure-based wireless communication network 14, between the mobile terminal 26 and an ITS application server 12. The messaging controller 60 is then configured to send one or more event notification messages to, or receive one or more event notification messages from, the ITS application server 12 via the first and second links 28, 30, by sending the one or more messages to, or receiving the one or more messages from, the mobile terminal 26 via the first link 28.

Those skilled in the art will further appreciate that the various "controllers" and/or "circuits" described may refer to a combination of analog and digital circuits, and/or one or more processors configured with software stored in memory and/or firmware stored in memory that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The present invention may of course be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method implemented by a mobile terminal for use in a cooperative intelligent transportation system (ITS), comprising:
    establishing a first communication link between the mobile terminal and an ITS application client associated with a vehicle;
    establishing a second communication link, via an infrastructure-based wireless communication network, between the mobile terminal and an ITS application server; and
    relaying one or more event notification messages between the ITS application client and the ITS application server via the first and second links, the one or more messages each indicating the occurrence of an event pertinent to travel conditions;
    wherein establishing the first link comprises establishing the first link between the ITS application client and an emulator client on the mobile terminal that emulates the ITS application client, and wherein said relaying comprises relaying the one or more messages between the ITS application client and the emulator client via the first link.

2. The method of claim 1, wherein establishing the second link comprises establishing the second link between the ITS application server and a geomessaging client on the mobile terminal, and wherein said relaying comprises relaying the one or more messages, via the second link, between the geomessaging client and a geomessaging server that functions as a proxy for the ITS application server.

3. The method of claim 2, further comprising mapping one of multiple flows of relayed messages to the ITS application client and sending information indicating that mapping from the geomessaging client to the geomessaging server, and wherein said relaying comprises relaying the one or more messages based on said mapping.

4. The method of claim 2, further comprising:
    receiving information from the geomessaging server indicating a first defined geographical area in which the vehicle is located; and
    responsive to determining that the vehicle is no longer located within the first area, sending information from the geomessaging client to the geomessaging server indicating the vehicle is no longer located within the first area and receiving a response from the geomessaging server indicating a second defined geographical area in which the vehicle is now located.

5. The method of claim 2, further comprising receiving information from the geomessaging server indicating a defined geographical area in which the vehicle is located, wherein said relaying comprises relaying the one or more messages from the ITS application server to the ITS application client, and wherein the one or more messages each indicate the occurrence of an event pertinent to travel conditions in the indicated area.

6. The method of claim 1, wherein relaying the one or more messages comprises at least one of:
    receiving one or more messages from the ITS application server, via the second link, at a geomessaging client on the mobile terminal and adapting the one or more messages for being relayed to the ITS application client, via the first link, by the emulator client on the mobile terminal that emulates the ITS application client; or
    receiving one or more messages from the ITS application client, via the first link, at the emulator client and adapting the one or more messages for being relayed to the ITS application server, via the second link, by the geomessaging client.

7. The method of claim 1, further comprising receiving one or more event notification messages from one or more ITS application clients associated with one or more other vehicles, and wherein said relaying comprises filtering those received event notification messages to selectively relay the one or more messages received from the ITS application client associated with the vehicle.

8. The method of claim 1, further comprising sending the one or more event notification messages, via a vehicular ad-hoc wireless communication network, to one or more other vehicles within the vicinity of the vehicle.

9. The method of claim 1, wherein establishing the first link comprises establishing the first link via short-range wireless communications.

10. The method of claim 1, wherein the mobile terminal comprises a user interface circuit and is configured to be used directly by an end-user via that user interface circuit.

11. A method implemented by an intelligent transportation system (ITS) application client associated with a vehicle, comprising:
    establishing a first communication link between the ITS application client and a mobile terminal that is configured to establish a second communication link, via an infrastructure-based wireless communication network, between the mobile terminal and an ITS application server; and sending one or more event notification messages to, or receiving one or more event notification messages from, the ITS application server via the first and second links, by sending the one or more messages to, or receiving the one or more messages from, the mobile terminal via the first link, the one or more messages each indicating the occurrence of an event pertinent to travel conditions;

wherein establishing the first link comprises establishing the first link between the ITS application client and an emulator client on the mobile terminal that emulates the ITS application client, and wherein said sending or receiving comprises sending the one or more messages to, or receiving the one or more messages from, the emulator client via the first link.

12. The method of claim 11, wherein the mobile terminal comprises a user interface circuit and is configured to be used directly by an end-user via that user interface circuit.

13. A mobile terminal for use in a cooperative intelligent transportation system (ITS), comprising:
  a first interface circuit configured to establish a first communication link between the mobile terminal and an ITS application client associated with a vehicle;
  a second interface circuit configured to establish a second communication link, via an infrastructure-based wireless communication network, between the mobile terminal and an ITS application server; and
  a relay controller circuit configured to relay one or more event notification messages between the ITS application client and the ITS application server via the first and second links, the one or more messages each indicating the occurrence of an event pertinent to travel conditions;
  wherein the first interface circuit is configured to establish the first link between the ITS application client and an emulator client on the mobile terminal that emulates the ITS application client, and wherein the relay controller circuit is configured to relay the one or more messages between the ITS application client and the emulator client via the first link.

14. The mobile terminal of claim 13, wherein the second interface circuit is configured to establish the second link between the ITS application server and a geomessaging client on the mobile terminal, and wherein the relay controller circuit is configured to relay the one or more messages, via the second link, between the geomessaging client and a geomessaging server that functions as a proxy for the ITS application server.

15. The mobile terminal of claim 14, wherein the relay controller circuit is configured to map one of multiple flows of relayed messages to the ITS application client, send information indicating that mapping from the geomessaging client to the geomessaging server, and relay the one or more messages based on said mapping.

16. The mobile terminal of claim 14, wherein the relay controller circuit is configured to:
  receive information from the geomessaging server indicating a first defined geographical area in which the vehicle is located; and
  responsive to determining that the vehicle is no longer located within the first area, send information from the geomessaging client to the geomessaging server indicating the vehicle is no longer located within the first area and receive a response from the geomessaging server indicating a second defined geographical area in which the vehicle is now located.

17. The mobile terminal of claim 14, wherein the relay controller circuit is configured to receive information from the geomessaging server indicating a defined geographical area in which the vehicle is located and relay the one or more messages from the ITS application server to the ITS application client, and wherein the one or more messages each indicate the occurrence of an event pertinent to travel conditions in the indicated area.

18. The mobile terminal of claim 13, wherein the relay controller circuit is configured to relay the one or more messages by at least one of:
  receiving one or more messages from the ITS application server, via the second link, at a geomessaging client on the mobile terminal and adapting the one or more messages for being relayed to the ITS application client, via the first link, by an emulator client on the mobile terminal that emulates the ITS application client; or
  receiving one or more messages from the ITS application client, via the first link, at the emulator client and adapting the one or more messages for being relayed to the ITS application server, via the second link, by the geomessaging client.

19. The mobile terminal of claim 13, wherein the relay controller circuit is configured to receive one or more event notification messages from one or more ITS application clients associated with one or more other vehicles, and filter those received event notification messages to selectively relay the one or more messages received from the ITS application client associated with the vehicle.

20. The mobile terminal of claim 13, wherein the relay controller circuit is configured to send the one or more event notification messages, via a vehicular ad-hoc wireless communication network, to one or more other vehicles within the vicinity of the vehicle.

21. The mobile terminal of claim 13, wherein the first interface circuit is configured to establish the first link via short-range wireless communications.

22. The mobile terminal of claim 13, further comprising a user interface circuit via which the mobile terminal is configured to be used directly by an end user.

23. An intelligent transportation system (ITS) application client associated with a vehicle, comprising:
  an interface circuit configured to establish a first communication link between the ITS application client and a mobile terminal that is configured to establish a second communication link, via an infrastructure-based wireless communication network, between the mobile terminal and an ITS application server; and
  a messaging controller circuit configured to send one or more event notification messages to, or receive one or more event notification messages from, the ITS application server via the first and second links, by sending the one or more messages to, or receiving the one or more messages from, the mobile terminal via the first link, the one or more messages each indicating the occurrence of an event pertinent to travel conditions;
  wherein the interface circuit is configured to establish the first link between the ITS application client and an emulator client on the mobile terminal that emulates the ITS application client, and wherein the messaging controller circuit is configured to send the one or more messages to, or receive the one or more messages from, the emulator client via the first link.

24. The ITS application client of claim 23, wherein the mobile terminal comprises a user interface circuit and is configured to be used directly by an end-user via that user interface circuit.

* * * * *